United States Patent
Harris

(10) Patent No.: US 10,759,711 B2
(45) Date of Patent: Sep. 1, 2020

(54) METHOD OF CONTROLLABLY COATING A FIBER PREFORM DURING CERAMIC MATRIX COMPOSITE (CMC) FABRICATION

(71) Applicant: Rolls-Royce High Temperature Composites Inc., Cypress, CA (US)

(72) Inventor: Stephen Harris, Long Beach, CA (US)

(73) Assignee: ROLLS-ROYCE HIGH TEMPERATURE COMPOSITES, Cypress, CA (US)

( * ) Notice: Subject to any disclaimer, the term of this patent is extended or adjusted under 35 U.S.C. 154(b) by 270 days.

(21) Appl. No.: 15/995,537

(22) Filed: Jun. 1, 2018

(65) Prior Publication Data

US 2019/0367417 A1 Dec. 5, 2019

(51) Int. Cl.
| | | |
|---|---|---|
| *C04B 35/571* | (2006.01) | |
| *C04B 35/80* | (2006.01) | |
| *C04B 35/565* | (2006.01) | |
| *C04B 35/58* | (2006.01) | |
| *C04B 35/10* | (2006.01) | |
| *C04B 35/18* | (2006.01) | |

(Continued)

(52) U.S. Cl.
CPC ............ *C04B 35/571* (2013.01); *C04B 35/10* (2013.01); *C04B 35/18* (2013.01); *C04B 35/563* (2013.01); *C04B 35/565* (2013.01); *C04B 35/58* (2013.01); *C04B 35/80* (2013.01); *C04B 35/573* (2013.01); *C04B 41/009* (2013.01); *C04B 41/5059* (2013.01); *C04B 41/87* (2013.01); *C04B 2235/3217* (2013.01); *C04B 2235/3463* (2013.01); *C04B 2235/3821* (2013.01); *C04B 2235/3826* (2013.01); *C04B 2235/3856* (2013.01); *C04B 2235/3873* (2013.01); *C04B 2235/5252* (2013.01); *C04B 2235/616* (2013.01); *F01D 5/282* (2013.01); *F01D 5/288* (2013.01); *F05D 2300/6033* (2013.01); *F23R 3/007* (2013.01); *F23R 2900/00018* (2013.01)

(58) Field of Classification Search
None
See application file for complete search history.

(56) References Cited

U.S. PATENT DOCUMENTS

| 10,138,168 B2 * | 11/2018 | Shim ...................... C04B 35/806 |
| 10,328,604 B2 * | 6/2019 | Podgorski ............. B29C 70/443 |

(Continued)

*Primary Examiner* — Benjamin A Schiffman
(74) *Attorney, Agent, or Firm* — Brinks Gilson & Lione

(57) ABSTRACT

A method of controllably coating a fiber preform has been developed. The method includes infiltrating a fiber preform with a first solvent to form a solvent-filled preform. After the infiltration, a slurry is applied to one or more outer surfaces of the solvent-filled preform to form a slurry coating thereon. The slurry coating comprises particulate solids dispersed in a second solvent having a vapor pressure higher than that of the first solvent. The slurry coating and the solvent-filled preform are dried. During drying, the second solvent evaporates from the slurry coating before the first solvent evaporates from the solvent-filled preform. The slurry coating dries to form a porous surface coating comprising the particulate solids on the one or more outer surfaces of the solvent-filled preform. The drying of the solvent-filled preform continues after formation of the porous surface coating to remove the first solvent.

20 Claims, 1 Drawing Sheet

(51) Int. Cl.
*C04B 35/563* (2006.01)
*F01D 5/28* (2006.01)
*C04B 35/573* (2006.01)
*C04B 41/00* (2006.01)
*C04B 41/87* (2006.01)
*C04B 41/50* (2006.01)
*F23R 3/00* (2006.01)

(56) References Cited

U.S. PATENT DOCUMENTS

| | | | |
|---|---|---|---|
| 2016/0326064 A1 | 11/2016 | Shim et al. | |
| 2017/0313627 A1* | 11/2017 | Shim | C04B 35/6264 |
| 2017/0313629 A1* | 11/2017 | Shim | C04B 41/009 |
| 2018/0305263 A1* | 10/2018 | Shim | C04B 41/009 |
| 2019/0185384 A1* | 6/2019 | Shim | C04B 35/573 |
| 2019/0359531 A1* | 11/2019 | Steffier | C04B 35/565 |
| 2019/0360097 A1* | 11/2019 | Harris | C23C 16/045 |
| 2019/0367418 A1* | 12/2019 | Harris | C04B 35/62834 |

* cited by examiner

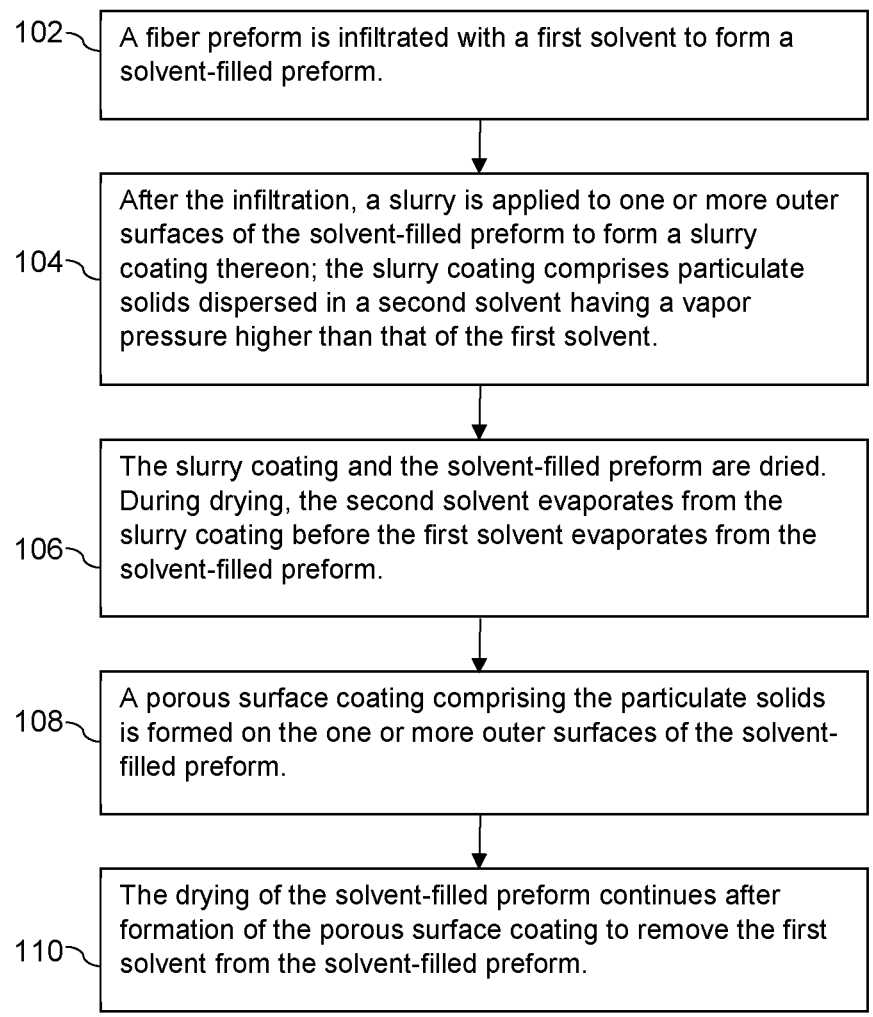

METHOD OF CONTROLLABLY COATING A FIBER PREFORM DURING CERAMIC MATRIX COMPOSITE (CMC) FABRICATION

TECHNICAL FIELD

The present disclosure is related generally to coating methods and more particularly to a method of forming a coating on a fiber preform during ceramic matrix composite (CMC) fabrication.

BACKGROUND

Ceramic matrix composites have been identified as candidate materials for components in the hot-section of jet engines due to their high temperature capability, low weight, and low coefficient of thermal expansion. In some instances these components are manufactured by laying up stacked 2D cloth or using 3D laminates to form a fiber preform, depositing a fiber-matrix interphase coating and rigidizing the fiber preform through chemical vapor infiltration (CVI), infiltrating the rigidized fiber preform with a ceramic slurry to form an impregnated fiber preform, and melt infiltrating the impregnated fiber preform with molten silicon to render the composite nearly fully dense.

The densified composite may have a surface topography that mimics the woven architecture of the fiber preform, instead of a smooth surface as desired to avoid an adverse impact on aerodynamic performance. A possible remedy is to apply a slurry-based surface coating to a partially processed composite to improve the surface uniformity, particularly after slurry infiltration and prior to melt infiltration. This can prove difficult, however, due to the tendency of the fiber preform to wick solvent from the slurry away from the surface. This wicking effect may cause localized consolidation which can allow the woven texture to persist throughout the surface coating.

BRIEF SUMMARY

A method of controllably coating a fiber preform during ceramic matrix composite (CMC) fabrication has been developed. The method includes infiltrating a fiber preform with a first solvent, which fills interstices between fibers, to form a solvent-filled preform. After the infiltration, a slurry is applied to one or more outer surfaces of the solvent-filled preform to form a slurry coating thereon. The slurry coating comprises particulate solids dispersed in a second solvent having a vapor pressure higher than that of the first solvent. The slurry coating and the solvent-filled preform are dried. During drying, the second solvent evaporates from the slurry coating before the first solvent evaporates from the solvent-filled preform; thus, the first solvent prevents or inhibits capillary wicking of the second solvent. The slurry coating dries to form a porous surface coating comprising the particulate solids on the one or more outer surfaces of the solvent-filled preform. The drying of the solvent-filled preform continues after formation of the porous surface coating to remove the first solvent from the solvent-filled preform.

BRIEF DESCRIPTION OF THE DRAWINGS

FIG. 1 is a flow chart of an embodiment of the method.

DETAILED DESCRIPTION

Described in this disclosure is a method of controllably forming a surface coating on a fiber preform to minimize or eliminate the wicking effect mentioned above, thereby enabling the formation of smooth and uniform surface layers on CMC components.

In brief, the method involves infiltrating a fiber preform or another porous body with a solvent prior to slurry coating. The solvent used for infiltration is selected to have a lower vapor pressure than the solvent used subsequently for slurry coating. During infiltration, interstices or pores in the fiber preform are filled with the solvent having the relatively slow evaporation rate. After infiltration, a slurry coating is applied to the solvent-filled fiber preform and then dried to form a porous surface coating. During drying, the solvent in the slurry coating evaporates faster than the solvent in the fiber preform, and capillary wicking of the solvent from the slurry coating may be prevented by the solvent-filled pores. Thus, after further drying and then melt infiltration of the fiber preform, a uniform surface layer having a morphology that follows the intended contours of the ceramic matrix composite (CMC) component may be formed. In addition, it may be possible to tailor the slurry viscosity through adjustment of the solids loading without impacting the desiccation rate. This may open a manufacturing window to applying slurry coatings using dip coating or spray coating methods.

The method of controllably coating a fiber preform is now described in detail in reference to the flow chart of FIG. 1.

The method entails infiltrating 102 a fiber preform with a first solvent to form a solvent-filled preform. The first solvent is selected to have a relatively low vapor pressure and slow evaporation rate, as discussed below. The fiber preform is exposed to the first solvent by dipping, immersion, submersion, spraying or another method. For example, the fiber preform may be submerged in the first solvent or a portion of the fiber preform may be dipped in the first solvent. During such exposure, the first solvent infiltrates (or infills) the fiber preform, filling interstices or pores between fibers and thus forming the solvent-filled preform. A vacuum may be exerted on the fiber preform during solvent infiltration to remove entrapped air and facilitate infilling.

After infilling with the first solvent, a slurry is applied 104 to one or more outer surfaces of the solvent-filled preform to form a slurry coating thereon. The slurry coating comprises particulate solids dispersed in a second solvent which is selected to have a higher vapor pressure than the first solvent. As would be recognized by the skilled artisan, a liquid having a higher vapor pressure than another liquid evaporates faster in the same environment (e.g., while exposed to the same temperature, pressure, and/or humidity). In addition to the particulate solids and the second solvent, the slurry coating may also include one or more reactive elements, as discussed below, and a polymeric binder. Typically, the solids content of the slurry coating is in a range from about 15 vol. % to about 60 vol. %. It is understood that the composition of the slurry and that of the slurry coating (prior to drying) are substantially the same, excepting any differences due to solvent evaporation. The slurry may be applied 104 to the one or more outer surfaces of the solvent-filled preform by spreading, dipping, spraying, painting or using another coating technique known in the art. Typically, the slurry is applied 104 at room temperature (e.g., from about 15° C. to about 25° C.).

Referring again to the flow chart of FIG. 1, the slurry coating and the solvent-filled preform are then dried 106. During drying 106, the second solvent evaporates from the slurry coating before the first solvent evaporates from the solvent-filled preform. Thus, a porous surface coating comprising the particulate solids is formed 108 on the one or more outer surfaces of the solvent-filled preform. In other words, the slurry coating dries to form a porous surface coating while interstices of the solvent-filled preform remain substantially filled with the first solvent. The presence of the first solvent inhibits capillary wicking of the second solvent from the slurry coating during drying, such that a substantially uniform porous surface coating can be deposited. Although some amount of evaporation of the first solvent may occur as the slurry coating is dried, evaporation of the first solvent is insignificant compared to evaporation of the second solvent due to the difference in their vapor pressures.

The second solvent may have a vapor pressure from about two times to about 100 times greater than that of the first solvent. More typically, the vapor pressure of the second solvent is from about five times to about 50 times greater than that of the first solvent. In one example, the first solvent may have a vapor pressure no greater than about 30 hPa at 20° C., or no greater than about 25 hPa at 20° C., and typically no less than about 1 hPa at 20° C., although lower vapor pressures are possible. The first solvent may comprise water, such as deionized water, which has a vapor pressure of about 24 hPa at 20° C. In another example, the first solvent may comprise glycerin, which has a much lower vapor pressure than water. The second solvent may have a vapor pressure of at least about 40 hPa at 20° C., at least about 50 hPa at 20° C., at least about 100 hPa at 20° C., or at least about 200 hPa at 20° C., and typically no higher than about 500 hPa at 20° C. The second solvent may comprise acetone, for example, which has a vapor pressure of about 247 hPa at 20° C. In other examples, the second solvent may comprise ethyl alcohol or isopropyl alcohol, which have vapor pressures of about 59 hPa at 20° C. and about 44 hPa at 20° C., respectively. Generally speaking, the first and second solvents may be selected from any aqueous or organic solvent having a suitable vapor pressure.

The drying continues 110 after formation of the porous surface coating to partially or fully evaporate the first solvent from the solvent-filled preform. Once the fiber preform is sufficiently dried, additional composite fabrication steps, such as melt infiltration, may be employed to densify the fiber preform and the porous surface coating.

The entire drying process, from removing the second solvent from the slurry coating to removing the first solvent from the solvent-filled preform, may be carried out at room temperature over a time duration ranging from about 2 hours to about 48 hours. Alternatively, the drying process may be carried out at an elevated temperature (e.g., from about 30° C. to about 150° C.) to expedite solvent evaporation.

During melt infiltration, a molten metal or alloy flows through the porous surface coating and the fiber preform. Upon cooling of the melt, the infiltrated porous surface coating becomes a uniform surface layer on a ceramic matrix composite (CMC) component. The CMC component and the uniform surface layer include ceramic reaction products resulting from the reaction between the molten material and any reactive elements in the fiber preform or porous surface coating as well as ceramic phases (e.g., SiC particles) present prior to melt infiltration. The uniform surface layer may be machined if desired, but a machining step may not be necessary due to the smooth morphology of the as-formed surface layer.

The uniform surface layer formed after melt infiltration and the porous surface coating typically have a thickness in a range from about 10 microns to about 1,000 microns. The uniform surface layer may be substantially devoid of surface features, such as bumps or undulations, that reveal the morphology (e.g., woven architecture) of the underlying fiber preform. Instead, the uniform surface layer may have a substantially smooth, aerodynamic morphology that follows the intended contours of the CMC component, which may be a blade, vane, seal segment, combustor liner or other turbine engine component.

Accordingly, the uniform surface layer may be described as being devoid of unintended surface features having a depth similar in size to a radius or diameter of fiber tows in the fiber preform. In other words, the uniform surface layer may be devoid of unintended surface features having a depth in a range from about 10 microns to about 250 microns, and which may constitute a micro- or macroscale surface roughness. It is conceivable, however, that the uniform surface layer may exhibit roughness on a smaller scale (e.g., less than 10 microns).

The fiber preform employed in the method comprises a framework of ceramic fibers that may be constructed using fiber assembly, weaving and/or lay-up methods known in the art. The ceramic fibers may be continuous fibers having a length much greater than the diameter or width. Typically, the fibers are assembled into fiber tows that include tens to hundreds of individual fibers or filaments to ensure sufficient flexibility for weaving, preforming and/or ease of handling. The terms "fibers" and "fiber tows" may be used interchangeably in this disclosure. The ceramic fibers typically comprise silicon carbide, but they may also or alternatively comprise another ceramic, such as silicon nitride, alumina or aluminosilicate. After fiber assembly and lay-up to construct the fiber preform, chemical vapor infiltration may be employed to deposit an interphase coating and/or a rigidization coating on the fiber preform. The fiber preform may then undergo slurry infiltration using methods known in the art.

It is understood that the fiber preform employed in the method may be an impregnated fiber preform that has undergone slurry infiltration. In such a case, prior to exposure to the first solvent, the fiber preform may be infiltrated by a slurry including particulate matter dispersed in a carrier liquid to deposit the particulate matter (e.g., ceramic particles) within the preform. After slurry infiltration, the fiber preform may undergo drying and/or heating to remove the carrier liquid, thereby forming an impregnated fiber preform. In one example, the carrier liquid includes an aqueous solvent that is evaporated upon drying or heating. In another example, the carrier liquid includes a polymer that is thermally decomposed upon heating. The impregnated fiber preform may then be exposed to the first solvent, as described above. In this disclosure, the term "fiber preform" may be used broadly to refer to a fiber preform that has not undergone slurry infiltration and/or to an impregnated fiber preform.

The particulate matter contained in the impregnated fiber preform includes ceramic particles that become part of the ceramic matrix after melt infiltration. Typically, these ceramic particles comprise silicon carbide, but they may also or alternatively include silicon nitride, alumina, aluminosilicate, silicon nitrocarbide, boron carbide or another ceramic. Similarly, the particulate solids of the slurry coating and the porous surface layer include ceramic particles, such as silicon carbide, alumina, aluminosilicate, silicon nitrocarbide, silicon nitride, or boron carbide particles. Typical particle sizes are in a range from about 1 micron to about 30 microns. In addition to ceramic particles, the impregnated fiber preform and the slurry coating/porous ceramic layer may include reactive elements, such as graphite, diamond, carbon black, molybdenum, and/or tungsten, to react with the molten metal or alloy (e.g., silicon metal or a silicon alloy) during melt infiltration and promote formation of the desired ceramic.

In a preferred embodiment, the ceramic fibers comprise silicon carbide, and the ceramic particles and the ceramic matrix also comprise silicon carbide. Molten silicon or a silicon alloy may be used for melt infiltration. The ceramic matrix composite that is formed in this case may be referred to as a silicon carbide/silicon carbide or SiC/SiC composite. As used herein, the term "silicon carbide" refers broadly to the compound SiC as well as to other silicon-containing carbides. The ceramic matrix and the uniform surface layer may include a residual amount of unreacted metal, typically silicon or the silicon alloy used for melt infiltration, and there may also be a residual amount of carbon. Preferably, there is no more than about 10 vol. % unreacted metal or residual carbon.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of controllably coating a fiber preform during ceramic matrix composite (CMC) fabrication, the method comprising:
    infiltrating a fiber preform with a first solvent to form a solvent-filled preform;
    after the infiltration, applying a slurry to one or more outer surfaces of the solvent-filled preform to form a slurry coating thereon, the slurry coating comprising particulate solids dispersed in a second solvent having a vapor pressure higher than that of the first solvent; and
    drying the slurry coating and the solvent-filled preform, the second solvent being evaporated from the slurry coating before the first solvent is evaporated from the solvent-filled preform,
    wherein the slurry coating dries to form a porous surface coating comprising the particulate solids on the one or more outer surfaces of the solvent-filled preform, and
    wherein drying of the solvent-filled preform continues after formation of the porous surface coating to evaporate the first solvent.

2. The method of claim 1, wherein the vapor pressure of the second solvent is from about two times to about 100 times greater than that of the first solvent.

3. The method of claim 1, wherein the first solvent comprises a vapor pressure of no greater than about 30 hPa at 20° C.

4. The method of claim 3, wherein the first solvent is selected from the group consisting of: water and glycerin.

5. The method of claim 1, wherein the second solvent comprises a vapor pressure of at least about 40 hPa at 20° C.

6. The method of claim 5, wherein the second solvent is selected from the group consisting of: acetone, ethyl alcohol, and isopropyl alcohol.

7. The method of claim 1, wherein the slurry coating further comprises a polymeric binder and/or one or more reactive elements.

8. The method of claim 1, wherein infiltrating the fiber preform with the first solvent comprises dipping a portion of the fiber preform in the first solvent, submerging the fiber preform in the first solvent, or spraying the fiber preform with the first solvent.

9. The method of claim 1, further comprising, during the infiltration of the fiber preform with the first solvent, exerting a vacuum on the fiber preform to remove entrapped air.

10. The method of claim 1, wherein applying the slurry to the one or more outer surfaces comprises spreading, dipping, and/or spraying.

11. The method of claim 1, wherein drying of the slurry coating and the solvent-filled preform is carried out at room temperature over a time duration from about two hours to about 48 hours.

12. The method of claim 1, wherein drying of the slurry coating and the solvent-filled preform comprises heating.

13. The method of claim 1, wherein the porous surface coating comprises a thickness in a range from about 10 microns to about 1,000 microns.

14. The method of claim 1, wherein, prior to infiltrating the fiber preform with the first solvent, the fiber preform undergoes slurry infiltration followed by drying and/or heating to remove infiltrated carrier liquid and to deposit particulate matter therein, the fiber preform being an impregnated fiber preform.

15. The method of claim 14, wherein the particulate matter of the impregnated fiber preform includes ceramic particles selected from the group consisting of: silicon carbide particles, alumina particles, aluminosilicate particles, silicon nitrocarbide particles, silicon nitride particles, and boron carbide particles.

16. The method of claim 1, wherein the particulate solids of the slurry coating and the porous surface layer include ceramic particles selected from the group consisting of: silicon carbide particles, alumina particles, aluminosilicate particles, silicon nitrocarbide particles, silicon nitride particles, and boron carbide particles.

17. The method of claim 1, further comprising, after evaporating the first solvent, infiltrating the porous surface coating and the fiber preform with a molten metal or alloy,
    wherein, upon cooling, a CMC component with a uniform surface layer thereon is formed.

18. The method of claim 17, wherein the uniform surface layer follows contours of the CMC component and is substantially devoid of unintended surface features having a depth in a range from about 10 microns to about 250 microns.

19. The method of claim 17, wherein the molten metal or alloy comprises silicon or a silicon alloy, wherein the fiber preform comprises silicon carbide fibers, and wherein the particulate solids comprise silicon carbide particles.

20. The method of claim 17, wherein the CMC component is a gas turbine engine component selected from the group consisting of: blade, vane, seal segment, and combustor liner.

* * * * *